United States Patent [19]
Landry et al.

[11] Patent Number: 5,306,774
[45] Date of Patent: Apr. 26, 1994

[54] MISCIBLE BLENDS OF POLY(ALKYLENE OXIDE) VINYL CARBOXYLIC ESTER POLYMERS AND ACIDIC FUNCTIONAL POLYMERS

[75] Inventors: Christine J. T. Landry, Honeoye Falls; David M. Teegarden, Rochester; Bradley K. Coltrain; Wayne T. Ferrar, both of Fairport, all of N.Y.

[73] Assignee: Eastman Kodak Company, Rochester, N.Y.

[21] Appl. No.: 801,294

[22] Filed: Dec. 2, 1991

[51] Int. Cl.$^5$ .................. C08L 33/02; C08L 33/04
[52] U.S. Cl. ............................ 525/221; 525/212; 525/219; 525/222; 525/223
[58] Field of Search ............ 525/221, 222, 219, 223, 525/212

[56] References Cited

U.S. PATENT DOCUMENTS

| | | | |
|---|---|---|---|
| 3,822,232 | 7/1974 | Huang et al. | 260/31.2 |
| 3,904,572 | 9/1975 | Huang et al. | 260/31.2 |
| 4,121,028 | 10/1978 | Marchessault et al. | 526/48.1 |
| 4,302,558 | 11/1981 | Ohya et al. | 525/212 |
| 4,806,582 | 2/1989 | Boutillier et al. | 524/178 |
| 5,155,172 | 10/1992 | Siol et al. | 525/212 |

FOREIGN PATENT DOCUMENTS 0408052  4/1990  European Pat. Off.

OTHER PUBLICATIONS

CA 110(18):155525p "Antistatic Plasticizers for Vinyl Chloride Resins," Kagoyama, et al. 1989.
Cesteros, L. C., et al., "Evidence From Infra-red Spectroscopy For Hydrogen Bonding in Poly(N-vinylpyrrolidone)/Poly(monobenzyl itaconate) Blends." *Polymer Commun.*, vol. 31, (1990) pp. 152-155.
Cowie, J. M. G., et al., "Prediction of the miscibility range in blends of poly(styrene-co-methyl methacrylate): a six interaction-parameter system" *Polymer*, vol. 31, 1990, p. 486.
Frechet, J. M. J., et al., "Novel Derivatives of Poly(-4-hydroxystyrene) With Easily Removable Tertiary, Allylic, or Benzylic Ethers." *Polymer Bulletin*, vol. 20, (1988), pp. 427-434.
Cowie, J. M. G., et al., "Glass and Subglass Transitions in a Series of Poly(itaconate esters) with Methyl-Terminated Poly(ethylene oxide) side chains." *J. of Polymer Science: Polymer Physics Edition*, vol. 23 (1985) pp. 2181-2191.
Katime, I. A., et al., "Melting and Crystallization Behaviour of the Poly(vinylidene fluoride)/Poly(monobenzyl itaconate) Blends." *Polymer Bulletin*, vol. 21 (1989) pp. 69-76.
Moskala, E. J., et al, "Concerning the Miscibility of Poly(vinyl phenol) Blends-FT ir.r. study." *Polymer*, vol. 26 (1985) pp. 228-233.
Serman, C. J., et al., "Studies of the phase behaviours of poly(vinylphenol)-poly(n-alkyl methacrylate) blends." *Polymer*, vol. 32, No. 6 (1991) pp. 1049-1058.
Quintana, J. R., et al., "Study of the Compatibility of Poly(ethylene oxide) with Poly(itaconates)." *Macromol. Chem.*, vol. 187 (1986), pp. 1457-1462.

(List continued on next page.)

Primary Examiner—John Kight, III
Assistant Examiner—P. Hampton-Hightower
Attorney, Agent, or Firm—Judith A. Roesler; J. Jeffrey Hawley

[57] ABSTRACT

A miscible blend comprising (a) a poly(alkylene oxide) vinyl carboxylic ester polymer and (b) a polymer bearing acidic functional groups has been discovered, with the blend being employable as a protective coating, membrane or film exhibiting good mechanical stablility and chemical resistance.

15 Claims, 1 Drawing Sheet

OTHER PUBLICATIONS

Shriver, D. F. et al, "Structure and Ion Transport in Polymer-Salt Complexes." *Solid State Ionics,* vol. 5 (1981) pp. 83-88.

Weston, J. E. and Steele, B. C. H., "Effects of Inert Fillers on the Mechanical and Electromechanical Properties of Lithium Salt-Poly (Ethylene Oxide) Polymer Electrolytes." *Solid State Ionics.* vol. 7 (1982) pp. 75-79.

Cowie, J. M. G. and Cree, S. H., "Electrolytes Dissolved in Polymers." in *Annual Review of Physical Chemistry,* vol. 40 (1989) (Annual Reviews, Inc., Palo Alto, Calif.) pp. 85-113.

Cowie, J. M. G. and Martin A. C. S., "Ionic Conductivity of Poly(diethoxy(3)methyl itaconate) containing lithium perchlorate." *Polymer Commun,* vol. 26 (1985) pp. 298-300.

Bannister, et al., "Ionic conductivities of poly(methoxy polyethylene glycol monomethacrylate) complexes with $LiSO_3CH_3$." *Polymer,* vol. 25 (1984) pp. 1600-1602.

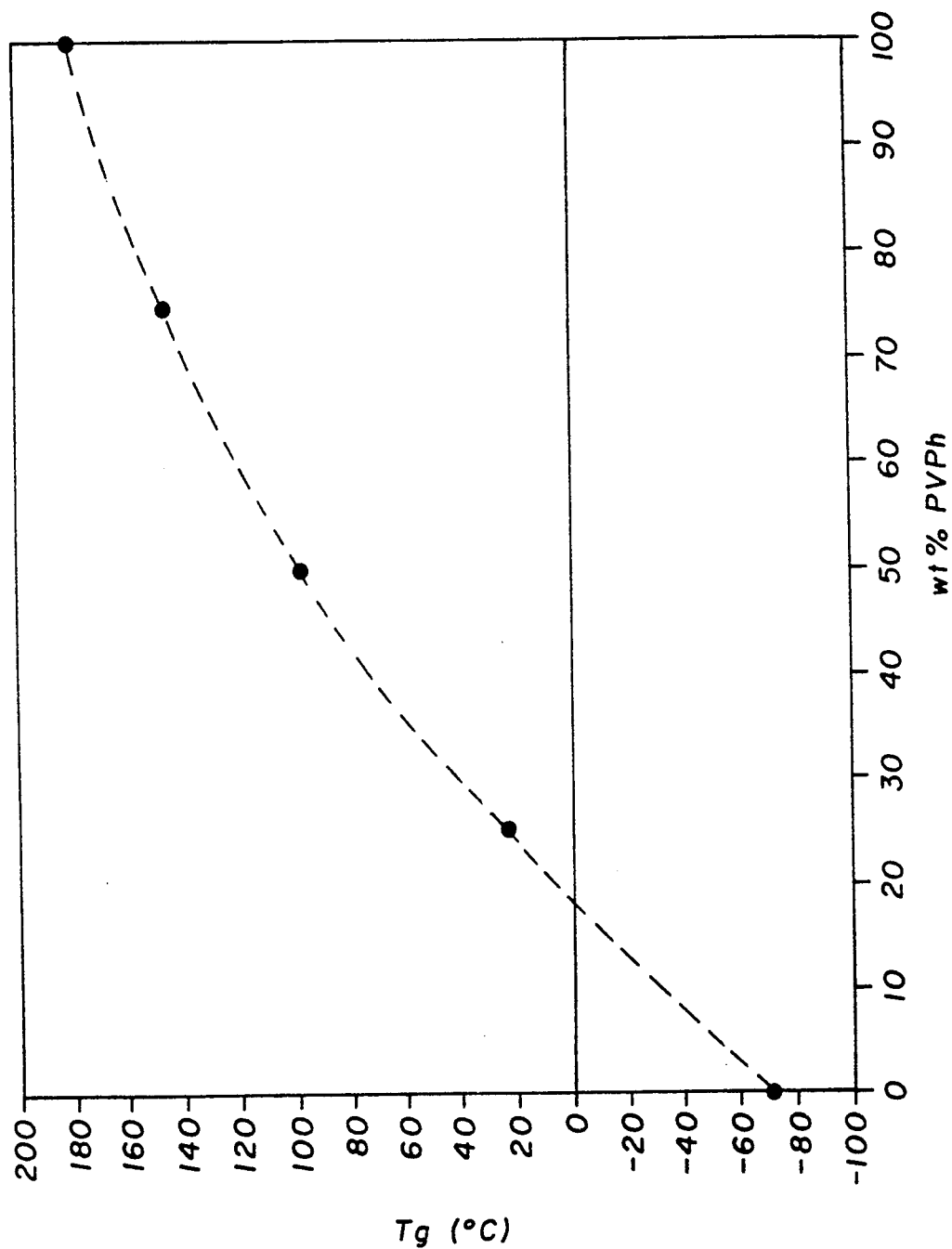

MISCIBLE BLENDS OF POLY(ALKYLENE OXIDE) VINYL CARBOXYLIC ESTER POLYMERS AND ACIDIC FUNCTIONAL POLYMERS

FIELD OF THE INVENTION

The present invention relates to miscible blends of polymers.

BACKGROUND OF THE INVENTION

The general class of poly(alkylene oxide) vinyl carboxylic ester polymers is known. Both miscible and immiscible blends of itaconate polymers with other polymeric components have been reported in the literature.

Miscible polymer blends are desirable because they provide a route to producing materials having improved properties such as easier processing, better mechanical stability, better chemical resistance, and lower cost in production. Miscible blends do not undergo phase separation, thus helping avoid stratification of the polymeric components during or after processing. Miscibility ensures homogeneity and unity of properties of the blend. Miscible blends exhibit a single glass transition temperature ("$T_g$") and tend to be transparent (in the absence of crystallinity).

Immiscible blends are opaque and, because of the low physical attractive forces across the phase boundaries, suffer from delamination at the phase boundaries. Consequently, immiscible blends are less desirable for a number of uses.

While a number of miscible polymer pairs are known, the miscibility of polymer blends remains unpredictable. There is a continuing desire to discover components which form miscible blends with poly(alkylene oxide) vinyl carboxylic ester polymers.

SUMMARY OF THE INVENTION

In accordance with the present invention miscible blends comprising (a) a poly(alkylene oxide) vinyl carboxylic ester polymer and (b) a polymer bearing acidic functional groups are provided.

It is an advantageous feature of this invention that the above-described blend is miscible and does not exhibit large scale phase separation, as demonstrated by the presence of only one $T_g$. It is another advantageous feature that, in the absence of crystallinity, the novel blends are optically transparent and may be utilized as protective coatings, membranes, or films that exhibit good mechanical stability and chemical resistance.

Additionally, the miscible blends of the invention may find utility as gas or ionic transport membranes or polymeric electrolytes upon the addition of appropriate salts. Other uses will be apparent to those skilled in the art.

BRIEF DESCRIPTION OF THE DRAWINGS

The FIGURE is a graphical plot of the glass transition temperature (identified as "$T_g$"), as measured by differential scanning calorimetry (taken as the onset of the change in heat capacity with temperature at 20° C./minute) for blends in accordance with this invention of poly[bis(methoxyethoxyethoxy)-itaconate] and poly(vinylphenol) (identified as "PVPh"), as a function of the weight percent of the PVPh.

DETAILED DESCRIPTION OF THE INVENTION

In accordance with the invention there are provided miscible blends comprising (a) a poly(alkylene oxide) vinyl carboxylic ester polymer [designated "Component (a)"] and (b) a polymer bearing acidic functional groups [designated "Component (b)"]. It should be noted at the outset that the blend can contain other components, as discussed in more detail hereinafter.

The poly(alkylene oxide) vinyl carboxylic ester component of the blend is represented by repeating units of the following structure I:

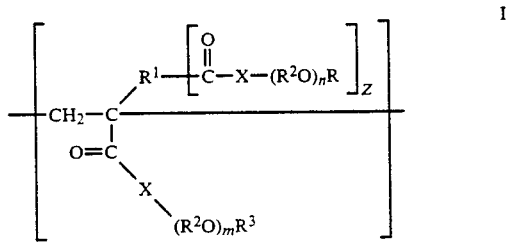

wherein the repeating units may the same or different and n is an integer from 1 to about 50; m is an integer from 0 to about 50; X is sulfur, oxygen or nitrogen; Z is 0 or 1; R, $R^2$ and $R^3$ are defined below; and $R^1$ is defined within the following general proviso such that when Z is 1 then $R^1$ is a divalent methylene, and when Z is 0, then m is not 0, and $R^1$ is a hydrogen, methyl, or ethyl.

R and $R^3$ are independently defined as hydrogen, a branched or unbranched $C_1$ to $C_{18}$ alkyl (such as, for example, methyl, ethyl, n-butyl, t-butyl, isopropyl, methylpentyl, hexyl, isohexyl, decyl, tetradecyl and octadecyl); branched or unbranched $C_1$ to $C_{18}$ alkenyl (such as, for example, ethenyl, propenyl, isopropenyl, 1-methylethenyl and neohexylenyl); $C_6$ to $C_{18}$ aryl (such as, for example, benzyl, phenyl, anilinyl, anisolyl, toluyl and biphenyl). Additionally the alkyl, alkenyl or aryl groups defining R and $R^3$ may be substituted with one or more substituents including, but not limited to, halo atoms (such as fluoro, chloro, bromo and iodo), amino groups (such as $-NH_2$, $-NHCH_3$ and $-N(CH_3)_2$), thio containing groups (such as $C_1$-$C_4$ alkylthio, for example, methylthio and ethylthio), nitro, or nitroaromatic groups (such as nitrobenzyl, nitrophenyl, and the like).

$R^2$ is randomly selected from straight or branched chain alkylene groups having from 2 to about 4 carbon atoms, such as ethylene, n-propylene, isopropylene and n-butylene. By "randomly selected from", it is meant that the $R^2$ in each repeating ($R^2$-0) unit present may be the same or different provided that each $R^2$ contains from 2 to about 4 carbon atoms. For example, where n or m is 2, the alkylene chain could be $-CH_2CH_2OCHCH_3CHCH_3O-$.

Component (a) is more preferably defined wherein n is an integer from 2 to 10; m is an integer from 2 to 10; X is oxygen; R and $R^3$ are independently selected from $-H$, $-CH_3$, $-CH_2CH_3$, $-CF_3$, $-CH_2CF_3$, $-CH_2CF_2CF_3$, $-CH_2CF_2CF_2CF_3$, $-CH_2CCl_3$, $-(CH_2)_5CH_3$, $-(CH_2)_4-CH=CH-CH_3$, $-CH_2-O-CH_3$, and $-(C_6H_4)-(C_8H_{17})$; $R^2$ is ethylene, n-propylene, isopropylene, n-butylene, or a mixture thereof if n or m are greater than 1; and Z is defined as 0 or 1, with the proviso that when Z is 1 then $R^1$ is methylene and when Z is 0 then R¹ is hydrogen, methyl or ethyl.

Component (a) is most preferably a poly[bis(methoxyethoxyethoxy)itaconate]; poly[bis(methoxyethoxyethoxyethoxy)itaconate]; poly(methoxyethoxyethoxy methacrylate); poly(methoxyethoxyethoxyethoxy methacrylate); or mixtures thereof.

As indicated above, component (a) is defined to include a mixture of the poly(alkylene oxide vinyl carboxylic ester monomer units defined by structure I above.

Component (a) may contain impurities without interrupting the miscibility of the blend. For example, one common impurity is a structurally similar acid ester moiety that is defined by structure I above when both Z is 1, m is 0, X is oxygen, R³ is hydrogen, R is methyl and R¹ is methylene. This acid ester moiety is typically produced when poly(alkylene oxide) vinyl carboxylic ester is synthesized. The acid ester moiety may be present in amounts of up to about 30 mole % of component (a) without being considered as detrimental to the blend of this invention.

Component (a) may also be a copolymer wherein the monomer unit defined by structure I is copolymerized with other monomer units. Suitable comonomers that may be copolymerized with the monomer units defined by structure I include: acrylates, methacrylates and styrene.

The poly(alkylene oxide) vinyl carboxylic ester monomers may be prepared by any of the techniques known to those skilled in the art. For example, itaconate monomers may be prepared by the acid catalyzed esterification of itaconic acid with a poly(alkylene oxide) precursor alcohol, as described by Cowie et al. in *J. Poly. Sci. Poly. Phys. Ed.* 23 (1985) p. 2181. In this process, the itaconic acid is esterified with the desired poly(alkylene oxide) precursor alcohol using p-toluene sulfonic acid as the catalyst and toluene as the solvent. Water is formed as a byproduct and may be removed using azeotropic distillation. For those monomers defined in structure I above wherein "n" is 1 or 2, the product can be purified by fractional vacuum distillation. For those monomers defined in structure I wherein n is 3 to 50, the unreacted alcohol can be removed with a water wash to leave the desired monomer in the toluene solution. As prepared by this method, the majority of the monomer composition is disubstituted ester. Some of the monomer composition, however, contains the acid ester moiety previously defined as an impurity. The acid ester moiety can be removed from the monomer composition by column chromatography prior to polymerization, if desired.

Acrylate monomers with poly(alkylene oxide) groups can be made by modification of the above procedures by beginning with acrylic acid esters, some of which are available commercially. Representative starting materials, for example, include methacryloyl chloride, acryloyl chloride, acrylic acid and methacrylic acid, with final monomeric units being, for example, methoxyethoxyethylacrylate and methoxyethoxyethylmethacrylate.

Polymerization of the itaconate or acrylate monomers is accomplished using an initiator such as azobisisobutyronitrile ("AIBN"), or benzoyl peroxide, under nitrogen employing procedures known to those skilled in the art.

As stated previously, component (b) is a polymer containing acidic functional groups. The term "acidic functional group" describes a functional group bearing a proton sufficiently acidic as to be capable of undergoing hydrogen bonding with polymers containing basic sites. Preferably, component (b) is a polymer comprising recurring units in an amount of at least about 5%, more preferably at least about 10%, of acidic functional groups of which are represented by the following structure II:

wherein R⁴ through R⁷ are independently selected from H, —CH₃, halo groups (such as, for example, fluoro, chloro, bromo or iodo), —OH, —CN, —(CH₂)$_n$*CO₂H, —C₆H₄CO₂H, —C₆H₄SO₃H, —C₆H₄C(CF₃)₂OH, —C₆H₄OH, —COO(CH₂)n*SO₃H, —COOC₆H₄OH, —CONHC₆H₄OH, —CONH(CH₂)n*SO₃H, —CONHCH₂CH(CH₃)CH₂SO₃H, —C₆H₄(CH₂)n-*CO₂H and —C₆H₄(CX*₂)$_n$*COOH, wherein in the above stated formulas: X* represents —F, —Cl, —Br or —CF₃; n* is an integer from 0 to 8; those compounds having aromatic rings (—C₆H₄) may be unsubstituted or substituted in various positions on the ring with one or more substituents selected from C₁ to C₆ alkyl groups (such as, for example, methyl, ethyl, t-butyl), C₁ to C₆ haloalkyl groups (such as, for example, fluoromethyl, fluoroethyl, fluoro-t-butyl, chloromethyl, chloroethyl, chloro-t-butyl, bromomethyl, bromoethyl or bromo-t-butyl), or halo groups (such as, —F, —Cl or —Br); and also R⁴ and R⁵ are further defined such that they may be connected together to form

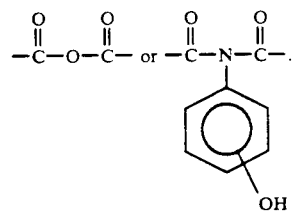

Examples of more preferred acidic functional group monomers included in the definition of structure II above, include the following: acrylic acid, methacrylic acid, maleic acid, citraconic acid, 1-propene-1,2,3-tricarboxylic acid, α-chloroacrylic acid, fumaric acid, chlorofumaric acid, itaconic acid, vinylbenzoic acid, vinylphenol, N-(hydroxyphenyl) acrylamide, N-(hydroxyphenyl) methacrylamide, hydroxyphenyl acrylate, hydroxyphenyl methacrylate, 3-sulfopropyl methacrylate, 2-acrylamido-2-methylpropane sulfonic acid, vinyl alcohol, vinyl chloride, acrylonitrile, and copolymers made from mixtures thereof.

Most preferably, at least one of the groups defined by R⁴ through R⁷ is selected from —C₆H₄COOH, —C₆H₄OH, —C₆H₄SO₃H and —C₆H₄C(CF₃)₂OH.

Phenol formaldehyde resins constitute an additional class of polymers containing acidic functional groups which fall within the definition of component (b).

According to this invention, component (b) may be a homopolymer or a copolymer. When a homopolymer, a single type of monomeric unit (as described above) is polymerized. When a copolymer, monomeric units (as described above) are copolymerized with suitable comonomers, wherein at least about 5%, preferably at least about 10%, of the repeating units of the copolymer are acidic functional groups defined by structure II. Suitable comonomers that may be copolymerized with the monomers with acidic functional groups include vinyl monomers. Examples of suitable vinyl monomers include vinyl aromatics such as styrene, ethylene, acrylates and methacrylates. Preferred copolymers include poly(styrene-co-styrene-4-sulfonic acid), poly(methacrylate-co-methacrylic acid), poly(styrene-co-styrene carboxylic acid), poly(styrene-co-vinylphenol) and poly[styrene-co-4-(1,1,1,3,3,3-hexafluoro-2-hydroxypropyl)styrene].

The polymers, or copolymers, defining component (b) are known and can be prepared by the various methods known to those skilled in the art. For example, the preparation of high molecular weight vinylphenol containing polymers is described in Frechet et al., "Novel Derivative of Poly(4-hydroxystyrene) with Easily Removable Tertiary, Allylic or Benzylic Ethers," *Polymer Bulletin*, Vol. 20, pp. 427–434 (1988). (For the general discussion of the polymerization of acidic monomers, see G. Odian, "Principles of Polymerization," 2nd ed. Wiley-Interscience, New York 1981.) As known in the art, in certain cases (for example, vinylphenol or vinyl alcohol), the acidic functional group preferably is protected with a removable functional (or protecting) group, such as alkyl, aceto, benzoyl, benzyl, tetrahydropyranyl, t-butyloxycarbonyl, trimethylsilyl and t-butyldimethylsilyl (or trialkylsilyl) groups, prior to polymerization. This is either because the acidic monomer itself is not stable or because the acidic functional group would interfere with the polymerization.

Additional components which may be included with components (a) and (b) prior to or during their blending include low-lattice energy salts to facilitate ion transport. For a general discussion on the addition of polymer-salt complexes, see, Shriver, et al. "Structure and Ion Transport in Polymer Salt Complexes," *Solid State Ionics*, Vol. 5, pp. 83–88 (1981). Suitable low lattice salts include, but are not limited to, $KCF_3SO_3$, $Ca(CF_3SO_3)_2$, $Zn(BF_4)_2$, $NaCF_3SO_3$, $LiBF_4$, $LiCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $C_4F_9SO_3K$, $KPF_6$, $NaB(C_6H_5)_4$, $LiClO_4$, LiI, NaI, KI, KSCN, LiSCN, NaSCN and mixtures thereof. When employed, generally, low concentrations of the salt are preferred, for example, less than about 15 weight percent of the component (a).

Other additional components which may be included in the miscible blend prior to or during the blending of components (a) and (b) include plasticizers (such as tricresyl phosphate and dioctyl phthalate).

The miscible blends of this invention are readily prepared by mixing about 1 to 99 parts by weight of component (a) with about 99 to 1 parts by weight of component (b), based on the 100 parts of the combined components (a) and (b). As a practical matter, most of the polymers are miscible over the entire concentration range.

Any number of methods which are known in the art may be employed in blending components (a) and (b). For example, components (a) and (b) can be mixed in their powder form and then blended by melt extruding the mixture in a screw extruder. In another method, the polymer components can be blended by dissolving both components in a common solvent, for example, dioxane, pyridine, 2-butanone, or tetrahydrofuran, and then precipitating in a non-solvent for both of the polymers, such as, for example, hexane. Alternatively, rather than precipitating the blend in a non-solvent, the blend can be solvent cast onto an inert substrate or into a mold.

In accordance with this invention, the novel blends generally exhibit the homogeneity of a single material, as determined by a single glass transition temperature or optical transparency. If so desired, the components may be separated by conventional techniques after blending. Optionally, for cross-linking purposes, the blends may cured at a high temperature, approximately about 150° C. to about 250° C.

The mechanical and chemical characteristics of the novel blends allow for various applications of the blends. For example, an article of manufacture having a metallic, polymeric, glass, ceramic or fabric substrate may have the blend deposited on the substrate, wherein the blend is deposited as a coating over the entire substrate or specific regions of the substrate, in any suitable manner. Such an application provides protection of the article. Additionally, the blend may be processed as a free standing membrane or film, by any suitable method known to those skilled in the art. Further, the blends may be used as gas or ionic membranes and polymeric electrolytes.

In the nonlimiting examples below, the following polymers were blended and were unexpectedly found miscible. Comparative Examples VIII and IX are provided to show polymers that are closely related to the acidic functional group polymers which did not form a miscible blend with the poly(alkylene oxide) vinyl carboxylic ester component. The Table at the end of the examples shows the glass transition temperatures of the blends.

EXAMPLE I

Miscible Blends of Poly]Bis(Methoxyethoxyethoxy)-Itaconate] (MEE-It #1) and Poly(4-vinylphenol) (PVPh)

Poly[bis(methoxyethoxyethoxy) itaconate] ("MEE-It") was synthesized by esterification of itaconic acid. Into a 1 L round-bottomed flask equipped with reflux condenser, a magnetic stirbar and Dean-Stark receiver were placed 150 g (1.16 mol) itaconic acid, 292 mL (2.45 mol) of 2-(2-methoxyethoxyethanol), 300 mL toluene, and 2.0 g (10.5 mmol) p-toluenesulfonic acid (all obtained from Eastman Kodak Company). The flask was placed in an oil bath at 150° C. and refluxed under an argon flow for 24 hr as 41.3 mL of water was collected by azeotropic distillation. The 620 mL solution was split into two equal portions.

In the first portion, the toluene was removed on a rotary evaporator, an inhibitor (3-t-butyl-4-hydroxy-5-methylphenyl sulfide from Aldrich) was then added. The solution was thereafter distilled, collecting the product, hereinafter "MEE-It #1 momomer", at approximately 180° C. at 0.15 mm Hg.

The second portion was eluted through a basic alumina chromatographic column (2"×12") using dichloromethane as the eluant. The solvent was then removed by a rotary evaporator, and the inhibitor (3-t-butyl-4-hydroxy-5-methylphenyl sulfide) was added. The solution was thereafter distilled, collecting the product, hereinafter "MEE-It #2 monomer", at approximately 180° C. at 0.15 mm Hg.

Both MEE-It #1 monomer and MEE-It #2 monomer were polymerized in bulk in the following manner. For each monomer, a 250 mL, three-necked, round-bottomed flask fitted with a condenser, mechanical stirrer, and an argon inlet was charged with the itaconate monomer. AIBN was added in a ratio of moles of catalyst to moles of itaconate monomer of 0.013. The flask was heated at 60° C. for 17 hr under argon flow. The viscous polymer was then dissolved in THF to approximately 20% solids and was precipitated into diethyl ether chilled in a dry ice/acetone bath to yield a clear tacky solid. Alternatively the polymer can be isolated by dissolving in water 10% solids, dialyzing in a 10K molecular weight cutoff dialysis bag (Union Carbide) for 1-2 days, followed by freeze drying MEE-It #1 and MEE-It #2 monomers having been polymerized by this process are hereinafter identified as MEE-It #1 and MEE-It #2.

Component (b) was prepared by first obtaining poly [4-(t-butyloxycabonyloxy)styrene] ["poly(tBOC styrene)"] from the Synthetic Chemicals Division, Eastman Kodak Company. Deprotection of the poly(tBOC styrene) to form poly(vinylphenol) ("PVPh") occurred in a three-necked, round-bottomed flask equipped with mechanical stirrer, reflux condenser, and argon inlet tube by dissolving it under argon in sufficient p-dioxane to make a 15-20% solution. Trifluoroacetic acid was then added and the solution refluxed for 48 hr. The clear reaction mixture was precipitated into a large excess of water forming a white polymer. The polymer (now PVPh) was filtered and washed well with water until the pH of the washes was 6. The PVPh was then dried in a vacuum oven at 75° C. for at least 72 hr before use. The absolute weight average molecular weight of the PVPh used was 35,000, as determined by size exclusion chromatography ("SEC").

A solution of 5 weight percent concentration of MEE-It #1 was prepared by dissolving 1 gram of MEE-It #1 (having 20% by weight of the acid ester units as determined by titration) in 19 g of tetrahydrofuran ("THF"). A solution of 5 weight percent concentration of PVPh was prepared by dissolving 1 g of the deprotected PVPh in 19 g of THF. The solutions of MEE-It #1 and PVPh were then mixed in proportions of 1:3, 2:2, and 3:1 by weight and solution cast onto an inert substrate. The solvent was removed by evaporation. All the resulting free-standing films were easily removed from the substrate and were optically transparent, as visually observed.

Each blend showed a single glass transition temperature ($T_g$) as measured by differential scanning calorimetry (DSC) employing a DuPont ® 990. The $T_g$ values are reported in the Table. As illustrated in the FIGURE, the $T_g$ of the blends varied as a function of the weight percentages of the individual polymer components. The single $T_g$ for each composition and the optical transparency of the films indicates the overall miscibility of the blends.

EXAMPLE II

Miscible blends of
poly[bis(methoxyethoxyethoxy)-itanconate] ("MEE-It #2") and PVPh The procedures of Example I were repeated employing MEE-It #2 (as shown in Example I) rather than MEE-It #1. MEE-It #2 differed from MEE-It #1 by having less than 1% acid-ester moieties, as a result of the purification step of the monomer using column chromatography.

Solutions of MEE-It #2 and PVPh were prepared, as described in Example I. The solutions were then mixed in the 3 aliquots, blended and solution cast as described in Example I. All resulting blends were removed from the substrate to form free standing, optically transparent films and had single $T_g$ values, similar to those recorded for the blends of Example I.

EXAMPLE III

Miscible Blends of
Poly[Bis(Methoxyethoxyethoxyethoxy)Itaconate] ("MEEE-IT") and PVPh Poly[bis(methoxyethoxyethoxyethoxy)itaconate] ("MEEE-It") and was prepared by the procedure described in Example I, with the modification that triethylene glycol monomethylether (from Fluka) was employed rather than 2-(2-methoxy-ethoxyethanol). Since this monomer cannot be vacuum distilled, it was eluted down an alumina column, as described in Example 1, and the solvent removal was done on a rotary evaporator. The monomer was then polymerized, as described in Example 1, using AIBN as a catalyst. The PVPh used as component (b) was as described in Example I.

A solution having a 5 weight % concentration of MEEE-It was prepared by dissolving 1 g of the MEEE-It in 19 g of 2-butanone. A solution having a 5 weight percent concentration of the PVPh was prepared by dissolving 1 g of the deprotected PHPh in 19 g of 2-butanone. These solutions were then mixed in proportions, solution cast, and dried, as described in Example I. All resulting blends were removed from the substrate to form free standing, optically transparent films. The single $T_g$ values for each blend were recorded and appear in the Table.

EXAMPLE IV

Miscible Blends of
Poly[Bis(Methoxyethoxyethoxymethacrylate) ("MEE Methacrylate") and PVPh Component (a) was poly(methoxyethoxyethoxymethacrylate) ("MEE methacrylate") and was prepared using methacryloyl chloride and 2(2-methoxy ethoxy ethanol). The monomer was purified by elution on an alumina column followed by vacuum distillation. The polymer was then prepared by polymerization of the monomer using AIBN and the same technique as in Example I. The PVPh used as component (b) was as described in Example I.

A solution having a 5 weight % concentration MEE methacrylate was prepared by dissolving 1 g of the MEE methacrylate in 19 g of 2-butanone. A solution having a 5 weight % concentration of PVPh was prepared by dissolving 1 g of the PVPh in 19 g of 2-butanone. These solutions were then mixed in proportions and solution cast as described in Example I. All resulting blends were removed from the substrate to form free standing, optically transparent films. A single $T_g$ for each blend was recorded, with values appearing in the Table.

EXAMPLE V

Miscible Blends of MEEE-It"#2 and Poly (Styrene-co-4-vinylphenol) ["P(S-VPh22)"]

MEE-It #2, as described in Example II, was blended with poly (styrene-co-4-vinylphenol) ["P(S-VPh22)"], a random copolymer of styrene and vinylphenol. 4-(t- butyloxycarbonyloxy)styrene was obtained from the Synthetic Chemicals Division, Eastman Kodak Company and used as received. The inhibitor in styrene (also obtained from Kodak) was removed by passing the styrene through a short column of neutral alumina. AIBN was used as the initiator and was purified by recrystallization several times from methanol before use. The AIBN and monomers were mixed in an Ace ® Glass polymerization tube and subjected to three freeze-thaw cycles under vacuum. After immersion in a 70° C. constant-temperature bath for 260 min, the viscous sample was cooled, dissolved in THF, and the product precipitated into a large excess of methanol in a blender. The product was filtered, washed well with fresh methanol, and dried in a 60° C. vacuum oven for 72 hrs. The deprotection of the copolymer was accomplished in the same manner as the deprotection of the poly(tBOC styrene) as described in Example 1. The P(S-VPh22) was characterized as having 22 mol % vinylphenol, with a weight average molecular weight of 96,000 g/mol, in polystyrene equivalents, as determined by SEC.

A solution having a 5 weight % concentration of MEE-It #2 was prepared by dissolving 1 g of the MEE-It #2 in 19 g of 2-butanone. A solution having a 5 weight percent concentration of P(S-VPh22) was prepared by dissolving 1 g of the P(S-VPh22) in 19 g of 2-butanone. These solutions were then mixed in proportions, solution cast, and dried as described in Example I. All resulting blends were removed from the substrate to form free standing, optically transparent films. A single $T_g$ was recorded for each blend, with the values appearing in the Table.

EXAMPLE VI

Miscible Blends of MEE-It #2 and Poly(Styrene-co-styrene-4-Sulfonic Acid) ["P(S-SA)"]

MEE-It #2, as described in Example II, was blended with poly(styrene-co-styrene-4-sulfonic acid) ["P(S-SA)"], a random copolymer prepared from commercial polystyrene (Dow Styron ® 666 from Dow Chemical), as described in Makowski, et al. U.S. Pat. No. 3,870,841). The copolymer was prepared by first dissolving polystyrene (52.1 g, 0.500 mol of monomer units) in 250 mL of 1,2-dichloroethane with stirring in a 500 mL flask. The solution was then heated to 50° C. whereupon a known volume of fresh 1M solution of acetyl sulfate in 1,2-dichloroethane was added, and the reaction mixture was stirred at 50° C. for 70 min (1 mole of acetyl sulfate was added for each mole of sulfonic acid desired). After 25 mL of absolute ethanol was added to terminate the reaction, the reaction mixture was added slowly to 3 L of rapidly boiling water to strip the solvent and precipitate the sulfonated polymer. The white mass was broken up in a blender, filtered, washed well with fresh water, and dried. The dry polymer was dissolved in THF and reprecipitated in water to remove traces of acetic and sulfuric acids. The resulting P(S-SA) had 12 mol % styrene-4-sulfonic acid. The weight average molecular weight of the polystyrene used was 241,000 g/mol, as determined by SEC. The mole percent of sulfonic acid was determined by titration of a solution of the polymer in a 90:10 THF/methanol solution with dilute NaOH standard.

A solution having a 5 weight % concentration of MEE-It #2 was prepared by dissolving 1 g of the MEE-It #2 in 19 g of 2 butanone. A solution of having a 5 weight percent concentration of P(S-SA) was prepared by dissolving 1 g of the P(S-SA) in 19 g 2-butanone. These solutions were then mixed in proportions, solution cast, and dried as described in Example I. All resulting blends were removed from the substrate to form free standing, optically transparent films. A single $T_g$ was recorded for each blend, as recorded in the Table.

EXAMPLE VII

Miscible Blends of MEE-It #2 and Poly(methylmethacrylate-co-Methacrylic Acid) ["P(MnMA)"]

MEE-It #2, as described in Example II, was blended with poly(methylmethacrylate-co methacrylic acid) ["P(MmMA)"]. The P(MmMA) was prepared by conventional free radical polymerization of methyl methacrylate and methacrylic acid in THF solvent using AIBN as the initiator. Three copolymers of P(MmMA) were used wherein the mole percentage of methacrylic acid was 5%, 10%, and 30%.

A solution having a 5 weight % concentration MEE-It #2 was prepared by dissolving 1 g of the MEE-It #2 in 19 g of 2-butanone. Solutions having a 5 weight % concentration P(MmMA) were prepared by dissolving 1 g each of the P(MmMA) copolymers in 19 g of 2-butanone. These solutions were then mixed in proportions of 1:3, 2:2 and 3:1 for each copolymer preparation of P(MmMA). The blends were then solution cast and dried as in Example I. The blends were removed from the substrate to form free standing, optically transparent films.

EXAMPLE VIII

Comparative Example

Immiscible Blends of MEE-It #2 and Polystyrene ("PS")

A MEE-It #2 polymer, as described in Example II, was mixed with a polystyrene ("PS") having a weight average molecular weight of 241,000 g/mole (Dow Styron 666). A 5 weight % concentration of MEE-It #2 was prepared by dissolving 1 g of MEE-It in 19 g of 2-butanone. A 5 weight % concentration of PS was prepared by dissolving 1 g of PS in 19 g of 2-butanone.

The solutions of MEE-It #2 and PS were mixed in proportions of 1:3, 2:2, and 3:1 by weight, as described in Example I. Each aliquot was solution cast onto an inert substrate and dried. The resulting films removed from the substrate were optically opaque (non-transparent) as visually observed. Each blend showed two $T_g$ values, essentially unshifted from the $T_g$ values of the pure components, as shown in the Table. The two $T_g$ values indicate the immiscibility of the two polymers.

EXAMPLE IX

Comparative Example

Immiscible Blends of MEE-It #2 and Poly(Methyl Methacrylate) ("PMMA")

A MEE-It #2 polymer, as described in Example II, was mixed with poly(methyl methacrylate) ("PMMA") having a polystyrene equivalent weight average molecular weight of 79,000 g/mol. The PMMA was purchased from Rohm and Haas Co.

A solution of 5 weight percent concentration of the MEE-IT #2 was prepared by dissolving 1 g of the MEE-It #2 in 19 g of 2-butanone. A solution of 5 weight percent concentration of the PMMA was prepared by dissolved 1 g of the PMMA in 19 g of 2-butanone.

The solutions of MEE-It #2 and PMMA were mixed in a 1:1 ratio and cast as in Example I. The dried film was opaque (non-transparent) and each blend showed two $T_g$ values, essentially unshifted from the $T_g$ values of the pure components thus indicating that these two polymers are immiscible.

TABLE

| Component (a)/Component (b) | Glass transition temperatures (onset, °C.) wt % (a)/wt % (b) | | | | |
|---|---|---|---|---|---|
| | 0/100 | 25/75 | 50/50 | 75/25 | 100/0 |
| MEE-It/PVPh (Ex. I) | 183 | 143 | 92 | 23 | −72 |
| MEEE-It/PVPh (Ex. III) | 183 | 113 | 47 | −8 | −70 |
| MEE-methacrylate/PVPh (Ex. IV) | 183 | 136 | 87 | 16 | −44 |
| MEE-It/p(S-VPh22) (Ex. V) | 122 | 80 | 37 | −1 | −72 |
| MEE-It/p(S-SA) (Ex. VI) | 116 | 108 | 87 | 15 | −72 |
| MEE-It/PS (Comp. Ex. VIII) | 96 | */93 | −55/94 | −44/83 | −72 |

*unable to determine

The invention has been described in detail with particular reference to preferred embodiments thereof, but it will be understood that variations and modifications can be effected within the spirit and scope of the invention. All patents, patent applications (published or unpublished, domestic or foreign), scientific literature, books and other prior art cited herein are each incorporated herein by reference for the teaching therein pertinent to this invention.

That which is claimed is:

1. A miscible blend comprising (a) a poly(alkylene oxide) vinyl carboxylic ester polymer and (b) a polymer comprising recurring units in an amount of at least about 5% of acidic functional groups represented by the following structure:

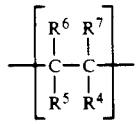

wherein $R^4$ through $R^7$ are independently selected from H, —CH$_3$, halo groups, —OH, —CN, —(CH$_2$)$_n$*CO$_2$H, —C$_6$H$_4$CO$_2$H, —C$_6$H$_4$SO$_3$H, —C$_6$H$_4$C(CF$_3$)$_2$OH, —C$_6$H$_4$OH, —COO(CH$_2$)$_n$*SO$_3$H, —COOC$_6$H$_4$OH, —CONHC$_6$H$_4$OH, —CONH(CH$_2$)$_n$*SO$_3$H, —CONHCH$_2$CH(CH$_3$)CH$_2$SO$_3$H, —C$_6$H$_4$(CH$_2$)$_n$*CO$_2$H or —C$_6$H$_4$(CX*)$_n$*COOH, wherein the above stated formulas; X* represents —F, —Cl, —Br or —CF$_3$; n* is an integer from 0 to 8; those compounds having aromatic rings (—C$_6$H$_4$) can be substituted with one or more C$_1$ to C$_6$ alkyl groups, C$_1$ to C$_6$ haloalkyl groups, or halo groups; and R$^4$ and R$^5$ may be connected together to form

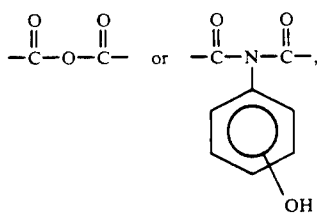

wherein said halo groups are selected from the group consisting of fluoro, chloro, bromo, and iodo and said miscible blend exhibits a single glass transition temperature.

2. A miscible blend according to claim 1 wherein said component (a) is represented by repeating units of the following structure:

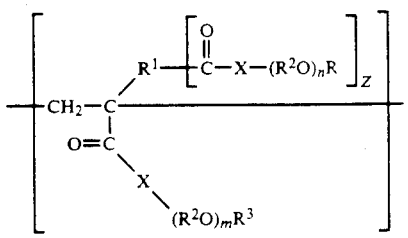

wherein the repeating units may be the same or different and n is an integer from 1 to about 50;
m is an integer from 0 to about 50;
X is sulfur, oxygen or nitrogen;
Z is 0 or 1;
R and R$^3$ are independently selected from hydrogen, a branched or unbranched C$_1$ to C$_{18}$ alkyl, branched or unbranched C$_1$ to C$_{18}$ alkenyl, or C$_6$ to C$_{18}$ aryl wherein said R and R$^3$ may be also substituted wherein said substituents are selected from halo atoms, amino groups, thio-containing groups, nitro, or nitro-containing groups;
R$^2$ is randomly selected from straight or branched chain C$_2$ to C$_4$ alkylene groups that may be the same or different when n or m is greater than 1; and
R$^1$ is defined within the proviso that when Z is 1 then R$^1$ is methylene; and when Z is 0, then m is not 0, and R$^1$ is hydrogen, methyl or ethyl.

3. A miscible blend according to claim 2 wherein component (b) is a polymer comprising recurring units in an amount of at least about 5% of acidic functional groups represented by the following structure:

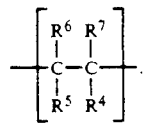

wherein $R^4$ through $R^7$ are independently selected from H, —CH$_3$, halo groups, —OH, —CN, —(CH$_2$)$_n$*CO$_2$H, —C$_6$H$_4$CO$_2$H, —C$_6$H$_4$SO$_3$H, —C$_6$H$_4$C(CF$_3$)$_2$OH, —C$_6$H$_4$OH, —COO(CH$_2$)$_n$*SO$_3$H, —COOC$_6$H$_4$OH, —CONHC$_6$H$_4$OH, —CONH(CH$_2$)$_n$*SO$_3$H, —CONHCH$_2$CH(CH$_3$)CH$_2$SO$_3$H, —C$_6$H$_4$(CH$_2$)$_n$*CO$_2$H or —C$_6$H$_4$(CX*$_2$)$_n$*COOH, wherein in the above stated formulas: X* represents —F, —Cl, —Br or —CF$_3$; n* is an integer from 0 to 8; those compounds having aromatic rings (—$C_6H_4$) can be substituted in the ortha, para, or meta positions on the ring with one or more $C_1$ to $C_6$ alkyl groups, $C_1$ to $C_6$ haloalkyl groups, or halo groups; and $R^4$ and $R^5$ may be connected together to form

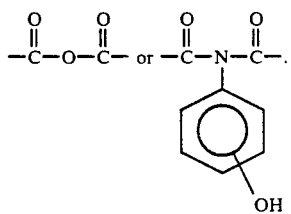

4. A miscible blend according to claim 2 wherein in component (a)

X is oxygen;

R and $R^3$ are independently selected from —H, —$CH_3$, —$CH_2CH_3$, —$CF_3$, —$CH_2CF_3$, —$CH_2CF_2CF_3$, —$CH_2CF_2CF_2CF_3$, —$CH_2CCl_3$, —$(CH_2)_5CH_3$, —$(CH_2)_4$—CH=CH—$CH_3$, —$CH_2$—O—$CH_3$, or —$(C_6H_4)$—$(C_8H_{17})$;

$R^2$ is ethylene, n-propylene, isopropylene, n-butylene, or a mixture thereof when n or m is greater than 1; and Z is defined as 0 or 1, with the proviso that when Z is $R^1$ then $R^1$ is methylene and when Z is 0 then $R^1$ is hydrogen, methyl or ethyl.

5. A miscible blend according to claim 2 wherein component (b) comprises recurring units in an amount of at least about 5% selected from the following acidic functional group monomers: acrylic acid, methacrylic acid, maleic acid, citraconic acid, 1-propene-1,2,3-tricarboxylic acid, α-chloroacrylic acid, fumaric acid, chlorofumaric acid, itaconic acid, vinylbenzoic acid, vinylphenol, N-(hydroxyphenyl)acrylamide, N-(hydroxyphenyl) methacrylamide, hydroxyphenyl acrylate, hydroxyphenyl methacrylate, 3-sulfopropylmethacrylate, 2-acrylamido-2-methylpropane sulfonic acid, vinyl alcohol, vinyl chloride, acrylonitrile, or copolymers made from mixtures thereof.

6. A miscible blend according to claim 5 wherein said recurring units are present in an amount of at least 10% of said polymer.

7. A miscible blend according to claim 6 wherein component (b) is a phenol formaldehyde resin.

8. A miscible blend according to claim 6 wherein said polymer is a homopolymer.

9. A miscible blend according to claim 8 wherein in component (a)

X is oxygen;

R and $R^3$ are independently selected from —H, —$CH_3$, —$CH_2CH_3$, —$CF_3$, —$CH_2CF_3$, —$CH_2CF_2CF_3$, —$CH_2CF_2CF_2CF_3$, —$CH_2CCl_3$, —$(CH_2)_5CH_3$, —$(CH_2)_4$—CH=CH—$CH_3$H, —$CH_2$—O—$CH_3$, or —$(C_6H_4)$—$(C_8H_{17})$;

$R^2$ is ethylene, n-propylene, isopropylene, n-butylene, or a mixture thereof when n or m is greater than 1; and Z is defined as 0 or 1, with the proviso that when Z is 1 then $R^1$ is methylene and when Z is 0 then $R^1$ is hydrogen, methyl or ethyl.

10. A miscible blend according to claim 2 wherein component (b) is a copolymer wherein at least 10% of the comonomers of said copolymers are said acidic functional group monomers selected from acrylic acid, methacrylic acid, maleic acid, citraconic acid, 1-propene-1,2,3-tricarboxylic acid, α-chloroacrylic acid, fumaric acid, chlorofumaric acid, itaconic acid, vinylbenzoic acid, vinylphenol, N-(hydroxyphenyl) acrylamide, N-(hydroxyphenyl) methacrylamide, hydroxyphenyl acrylate, hydroxyphenyl methacrylate, 3-sulfopropylmethacrylate, 2-acrylamido-2-methylpropane sulfonic acid, vinyl alcohol, vinyl chloride or acrylonitrile and the remaining monomers are vinyl monomers selected from the group consisting of styrene, ethylene, acrylates, and methacrylates.

11. A miscible blend according to claim 10 wherein said copolymers are poly(styrene-co-styrene-4sulfonic acid), poly(methacrylate-co-methacrylic acid), poly(styrene-co-styrene carboxylic acid), poly(styrene-co-vinylphenol) and poly[styrene-co-4-(1,1,1,3,3,3-hexafluoro-2-hydroxypropyl)styrene].

12. A miscible blend according to claim 11 wherein said component (a) is a poly{bis[(methoxyethoxyethoxy)itaconate]}; poly{bis[(methoxyethoxyethoxy)itaconate]}; poly(methoxyethoxyethoxy methacrylate); poly(methoxyethoxyethoxyethoxy methacrylate); or mixtures thereof.

13. A miscible blend according to claim 1 wherein said component (a) is a poly{bis[(methoxyethoxyethoxy)itaconate]};poly{bis[(methoxyethoxyethoxy)itaconate]}; poly(methoxyethoxyethoxy methacrylate); poly(methoxyethoxyethoxyethoxy methacrylate) or mixtures thereof and component (b) is a homopolymer having acidic functional groups represented by the following structure:

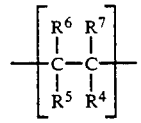

wherein at least one of the groups defined by $R^4$ through $R^7$ is independently selected from the group consisting of —$C_6H_4COOH$, —$C_6H_4OH$, —$C_6H_4SO_3H$ and —$C_6H_4C(CF_3)_2OH$.

14. A miscible blend according to claim 1 wherein component (a) is present in an amount from about 1 to 99 by weight and component (b) is present in an amount from about 99 to 1 parts by weight, with parts by weight based on the combined weight of components (a) and (b).

15. A miscible blend according to claim 1 further comprising a low-lattice energy salt selected from the group consisting of $KCF_3SO_3$, $Ca(CF_3SO_3)_2$, $Zn(BF_4)_2$, $NaCF_3SO_3$, $LiBF_4$, $LiCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $C_4F_9SO_3K$, $KPF_6$, $NaB(C_6H_5)_4$, $LiClO_4$, LiI, NaI, KI, KSCN, LiSCN, NaSCN and mixtures thereof.

* * * * *

UNITED STATES PATENT AND TRADEMARK OFFICE
CERTIFICATE OF CORRECTION

PATENT NO. : 5,306,774
DATED : April 26, 1994
INVENTOR(S) : Christine J. T. Landry, David M. Teegarden,
Bradley K. Coltrain, Wayne T. Ferrar It is certified that error appears in the above-indentified patent and that said Letters Patent is hereby corrected as shown below:

Column 11, line 50, claim 1 "-$C_6H_4(CX*)_n*COOH$, should read
--- $C_6H_4(CX*_2)_n*COOH$, ---

Column 13, line 30, claim 4 "Z is $R^1$" should read --- Z is 1 ---

Column 13, line 61, claim 9 "-$CH(_2)_4$-CH=CH-$CH_3$H, " should read
--- -$CH(_2)_4$-CH=CH-$CH_3$, ---

Column 14, line 20, claim 11 "poly(styrene-co-styrene-4sulfonic" should read --- poly(styrene-co-styrene-4-sulfonic ---

Column 14, line 52, claim 14 "99" should read --- 99 parts ---

Signed and Sealed this

First Day of November, 1994

BRUCE LEHMAN

*Attest:*

*Attesting Officer*   *Commissioner of Patents and Trademarks*